(12) United States Patent
Dearth et al.

(10) Patent No.: US 7,647,899 B2
(45) Date of Patent: *Jan. 19, 2010

(54) APPARATUS WITH MIXED FUEL SEPARATOR AND METHOD OF SEPARATING A MIXED FUEL

(75) Inventors: Mark Dearth, Dearborn, MI (US); Christian T. Goralski, Jr., St. Paul, MN (US)

(73) Assignee: Ford Global Technologies, LLC, Dearborn, MI (US)

(*) Notice: Subject to any disclaimer, the term of this patent is extended or adjusted under 35 U.S.C. 154(b) by 308 days.

This patent is subject to a terminal disclaimer.

(21) Appl. No.: 11/384,142

(22) Filed: Mar. 17, 2006

(65) Prior Publication Data

US 2007/0215071 A1 Sep. 20, 2007

(51) Int. Cl.
F02B 25/00 (2006.01)
F02B 13/00 (2006.01)

(52) U.S. Cl. .................. 123/1 A; 123/575

(58) Field of Classification Search .......... 123/1 A, 123/3, 575
See application file for complete search history.

(56) References Cited

U.S. PATENT DOCUMENTS

| | | | |
|---|---|---|---|
| 2,221,405 A | 11/1940 | Nallinger | |
| 3,589,348 A | 6/1971 | Reichhelm | |
| 3,794,000 A | 2/1974 | Hodgkinson | |
| 4,031,864 A | 6/1977 | Crothers | |
| 4,136,652 A | 1/1979 | Lee | |
| 4,205,650 A | 6/1980 | Szwarchier | |
| 4,256,075 A | 3/1981 | Fukui et al. | |
| 4,311,118 A | 1/1982 | Slagle | |
| 4,325,329 A | 4/1982 | Taylor | |
| 4,402,296 A | 9/1983 | Schwarz | |
| 4,411,243 A | 10/1983 | Hardenberg et al. | |
| 4,480,616 A | 11/1984 | Takeda | |
| 4,489,596 A | 12/1984 | Linder et al. | |
| 4,502,453 A | 3/1985 | Kabasin et al. | |
| 4,590,904 A | 5/1986 | Wannenwetsch | |

(Continued)

FOREIGN PATENT DOCUMENTS

EP 1057988 1/2006

(Continued)

OTHER PUBLICATIONS

U.S. Appl. No. 60/780,319, filed Mar. 8, 2007, Bromberg et al.

(Continued)

*Primary Examiner*—Noah Kamen
(74) *Attorney, Agent, or Firm*—Allan J. Lippa; Alleman Hall McCoy Russell & Tuttle LLP

(57) ABSTRACT

In an apparatus comprising a fuel tank, an internal combustion engine, and a separator positioned fluidically between the fuel tank and the internal combustion engine, a method of operating the apparatus is disclosed, wherein the method comprises inputting a mixed fuel containing a hydrocarbon component and an oxygenated component into the separator, separating the fuel in the separator into a hydrocarbon-enriched fuel fraction and an oxygenated fuel component-enriched fuel fraction, and controlling an amount of the hydrocarbon-enriched fuel fraction and an amount of the oxygenated fuel component-enriched fuel fraction provided to the engine based upon an engine operating condition.

26 Claims, 10 Drawing Sheets

U.S. PATENT DOCUMENTS

| | | |
|---|---|---|
| 4,648,367 A | 3/1987 | Gillbrand et al. |
| 4,706,630 A | 11/1987 | Wineland et al. |
| 4,810,929 A | 3/1989 | Strumbos |
| 4,817,576 A | 4/1989 | Abe et al. |
| 4,930,537 A | 6/1990 | Farmer |
| 4,945,881 A | 8/1990 | Gonze et al. |
| 4,962,789 A | 10/1990 | Benscoter |
| 4,993,386 A | 2/1991 | Ozasa et al. |
| 4,998,518 A | 3/1991 | Mitsumoto |
| 5,017,826 A | 5/1991 | Oshima et al. |
| 5,018,483 A | 5/1991 | Kashima et al. |
| 5,044,331 A | 9/1991 | Suga et al. |
| 5,044,344 A | 9/1991 | Tuckey et al. |
| 5,056,490 A | 10/1991 | Kashima |
| 5,056,494 A | 10/1991 | Kayanuma |
| 5,111,795 A | 5/1992 | Thompson |
| 5,131,228 A | 7/1992 | Mochizuki et al. |
| 5,188,087 A | 2/1993 | Saito |
| 5,204,630 A | 4/1993 | Seitz et al. |
| 5,230,309 A | 7/1993 | Suga et al. |
| 5,233,944 A | 8/1993 | Mochizuki |
| 5,335,637 A | 8/1994 | Davis et al. |
| 5,336,396 A | 8/1994 | Shetley |
| 5,357,908 A | 10/1994 | Sung et al. |
| 5,360,034 A | 11/1994 | Der Manuelian |
| 5,408,979 A | 4/1995 | Backlund et al. |
| 5,417,239 A | 5/1995 | Ford |
| 5,469,830 A | 11/1995 | Gonzalez |
| 5,477,836 A | 12/1995 | Hyodo et al. |
| 5,508,582 A | 4/1996 | Sugimoto et al. |
| 5,565,157 A | 10/1996 | Sugimoto et al. |
| 5,694,908 A | 12/1997 | Hsu |
| 5,740,784 A | 4/1998 | McKinney |
| 5,782,092 A | 7/1998 | Schultalbers et al. |
| 5,806,500 A | 9/1998 | Fargo et al. |
| 5,875,743 A | 3/1999 | Dickey |
| 5,921,222 A | 7/1999 | Freeland |
| 6,112,705 A | 9/2000 | Nakayama et al. |
| 6,112,725 A | 9/2000 | McKinney |
| 6,119,637 A | 9/2000 | Matthews et al. |
| 6,189,516 B1 | 2/2001 | Hei Ma |
| 6,229,253 B1 | 5/2001 | Iwata et al. |
| 6,318,083 B1 | 11/2001 | Machida et al. |
| 6,382,225 B1 | 5/2002 | Tipton |
| 6,494,192 B1 | 12/2002 | Capshaw et al. |
| 6,505,579 B1 | 1/2003 | Lee |
| 6,553,974 B1 | 4/2003 | Wickman et al. |
| 6,617,769 B2 | 9/2003 | Suzuki |
| 6,622,664 B2 | 9/2003 | Holder et al. |
| 6,622,690 B2 | 9/2003 | Ando et al. |
| 6,698,387 B1 | 3/2004 | McFarland et al. |
| 6,711,893 B2 | 3/2004 | Ueda et al. |
| 6,792,966 B2 | 9/2004 | Harvey |
| 6,845,616 B2 | 1/2005 | Jauss |
| 6,928,983 B2 | 8/2005 | Mashiki |
| 6,951,202 B2 | 10/2005 | Oda |
| 6,959,693 B2 | 11/2005 | Oda |
| 6,972,093 B2 | 12/2005 | Partridge et al. |
| 6,978,762 B2 | 12/2005 | Mori |
| 6,988,485 B2 | 1/2006 | Ichise et al. |
| 6,990,956 B2 | 1/2006 | Niimi |
| 7,055,500 B2 | 6/2006 | Miyashita et al. |
| 7,082,926 B2 | 8/2006 | Sadakane et al. |
| 7,159,568 B1 | 1/2007 | Lewis et al. |
| 7,178,503 B1 | 2/2007 | Brehob |
| 7,225,787 B2 | 6/2007 | Bromberg et al. |
| 7,255,080 B1 | 8/2007 | Leone |
| 7,261,064 B2 | 8/2007 | Bhaisora et al. |
| 7,278,396 B2 | 10/2007 | Leone et al. |
| 7,287,492 B2 | 10/2007 | Leone et al. |
| 7,287,509 B1 | 10/2007 | Brehob |
| 7,293,552 B2 | 11/2007 | Leone et al. |
| 2001/0035215 A1 | 11/2001 | Tipton et al. |
| 2003/0089337 A1 | 5/2003 | Cohn et al. |
| 2003/0127072 A1 | 7/2003 | Gmelin et al. |
| 2003/0221660 A1 | 12/2003 | Surnilla et al. |
| 2004/0035395 A1 | 2/2004 | Heywood et al. |
| 2004/0065274 A1 | 4/2004 | Cohn et al. |
| 2004/0083717 A1 | 5/2004 | Zhu et al. |
| 2004/0261763 A1 | 12/2004 | Hashimoto et al. |
| 2005/0051135 A1 | 3/2005 | Tomoda et al. |
| 2005/0066939 A1 | 3/2005 | Shimada et al. |
| 2005/0097888 A1 | 5/2005 | Miyashita |
| 2005/0103285 A1 | 5/2005 | Oda |
| 2005/0109316 A1 | 5/2005 | Oda |
| 2005/0109319 A1 | 5/2005 | Oda |
| 2005/0155577 A1 | 7/2005 | Ichise et al. |
| 2005/0155578 A1 | 7/2005 | Ichise et al. |
| 2005/0166896 A1 | 8/2005 | Sadakane |
| 2005/0172931 A1 | 8/2005 | Mori |
| 2005/0178356 A1 | 8/2005 | Shibagaki |
| 2005/0178360 A1 | 8/2005 | Satou |
| 2005/0183698 A1 | 8/2005 | Yonezawa |
| 2005/0274353 A1 | 12/2005 | Okubo et al. |
| 2006/0016429 A1 | 1/2006 | Mashiki |
| 2006/0075991 A1 | 4/2006 | Heywood et al. |
| 2006/0090732 A1 | 5/2006 | Shibagaki |
| 2006/0102136 A1 | 5/2006 | Bromberg et al. |
| 2006/0102145 A1 | 5/2006 | Cohn et al. |
| 2006/0102146 A1 | 5/2006 | Cohn et al. |
| 2006/0180099 A1 | 8/2006 | Aimoto et al. |
| 2006/0191727 A1 | 8/2006 | Usami et al. |
| 2007/0028861 A1 | 2/2007 | Kamio et al. |
| 2007/0028905 A1 | 2/2007 | Shinagawa et al. |
| 2007/0034192 A1 | 2/2007 | Kamio et al. |
| 2007/0119391 A1 | 5/2007 | Fried et al. |
| 2007/0119392 A1 | 5/2007 | Leone et al. |
| 2007/0119394 A1 | 5/2007 | Leone |
| 2007/0119411 A1 | 5/2007 | Kerns |
| 2007/0119412 A1 | 5/2007 | Leone et al. |
| 2007/0119413 A1 | 5/2007 | Lewis et al. |
| 2007/0119414 A1 | 5/2007 | Leone et al. |
| 2007/0119415 A1 | 5/2007 | Lewis et al. |
| 2007/0119416 A1 | 5/2007 | Boyarski |
| 2007/0119421 A1 | 5/2007 | Lewis et al. |
| 2007/0119422 A1 | 5/2007 | Lewis et al. |
| 2007/0119425 A1 | 5/2007 | Lewis et al. |
| 2007/0204813 A1 | 9/2007 | Arai et al. |
| 2007/0215069 A1 | 9/2007 | Leone |
| 2007/0215072 A1 | 9/2007 | Dearth et al. |
| 2007/0215101 A1 | 9/2007 | Russell et al. |
| 2007/0215102 A1 | 9/2007 | Russell et al. |
| 2007/0215104 A1 | 9/2007 | Hahn |
| 2007/0215110 A1 | 9/2007 | Stein et al. |
| 2007/0215111 A1 | 9/2007 | Sunrilla |
| 2007/0215125 A1 | 9/2007 | Dearth et al. |
| 2007/0215127 A1 | 9/2007 | Dearth et al. |
| 2007/0215130 A1 | 9/2007 | Shelby et al. |
| 2007/0219674 A1 | 9/2007 | Leone |
| 2007/0221163 A1 | 9/2007 | Kamio |
| 2007/0234976 A1 | 10/2007 | Dearth et al. |

FOREIGN PATENT DOCUMENTS

| | | |
|---|---|---|
| JP | 61065066 | 3/1986 |
| JP | 2007 056754 | 3/2007 |
| JP | 2007056754 | 3/2007 |
| WO | WO 2004/097198 | 11/2004 |
| WO | WO 2006/055540 | 5/2006 |
| WO | WO 2007/106354 | 9/2007 |

| | | |
|---|---|---|
| WO | WO 2007/106416 | 9/2007 |

OTHER PUBLICATIONS

U.S. Appl. No. 11/682,372, filed Mar. 6, 2007, Bromberg et al.
U.S. Appl. No. 11/782,050, filed Jul. 24, 2007, Bromberg et al
U.S. Appl. No. 60/781,598, filed Mar. 10, 2006, Blumberg et al.
U.S. Appl. No. 11/683,564, filed Mar. 8, 2007, Bromberg et al.
U.S. Appl. No. 60/780,981, filed Mar. 10, 2006 Cohn et al.
U.S. Appl. No. 11/684,100, filed Mar. 9, 2007, Cohn et al.
U.S. Appl. No. 6/790,715, filed Apr. 10, 2006, Bromberg et al.
U.S. Appl. No. 6/746,507, filed May 5, 2006, Cohn et al.
U.S. Appl. No. 60/747,865, filed May 22, 2006, Heywood et al.
U.S. Appl. No. 60/832,836, filed Jul. 24, 2006, Bromberg et al.
U.S. Appl. No. 60/948,753, filed Jul. 10, 2007, Bromberg et al.
U.S. Appl. No. 60/973,499, filed Sep. 19, 2007, Bromberg.
U.S. Appl. No. 11/871,496, filed Oct. 12, 2007, Zubeck et al.
U.S. Appl. No. 11/955,246, filed Dec. 12, 2007, Pursifull et al.
U.S. Appl. No. 11/962,683, filed Dec. 21, 2007, Pursifull et al.
D.R. Cohn et al., "Direct Injection Ethanol Boosted Gasoline Engines: Biofuel Leveraging for Cost Effective Reduction of Oil Dependence and CO2 Emissions" Mar. 15, 2005, Massachusetts Institute of Technology.
L. Bromberg et al., "Calculations of Knock Suppression in Highly Turbocharged Gasoline/Ethanol Engines Using Direct Ethanol Injection", Jul. 7, 2005, Massachusetts Institute of Technology.
Hunter, M. Park, "1962 Oldsmobile Jetfire," originally appeared in Special Interest Autos, Apr. 1996, http://www.tctc.com/~park/mph/pageCLIP/page62JET/62jet.htm, Nov. 7, 2006.
Vance, Bill, "Turbocharger Boosted Engine's Efficiency: Developed to maintain high-altitude performance," for the Calgary Herald Edmonton, http://www.ucalgary.ca/~csimpson/Articles/JetFire.html, Nov. 7, 2006.
U.S. Appl. No. 11/464,172, filed Aug. 11, 2006, Stein.
U.S. Appl. No. 11/566,131, filed Dec. 1, 2006, Blumberg et al.
U.S. Appl. No. 11/776,120, filed Jul. 11, 2007, Stein et al.
U.S. Appl. No. 11/846,373, filed Aug. 25, 2007, Leone et al.
U.S. Appl. No. 11/851,116, filed Sep. 6, 2007, Kerns.
U.S. Appl. No. 11/923,418, filed Oct. 24, 2007, Leone et al.
U.S. Appl. No. 11/924,395, filed Oct. 25, 2007, Brehob.
Stephen Russ, "A Review of the Effect of Engine Operating Conditions on Borderline Knock", SAE Technical Paper Series 960497, Feb. 26-29, 1996.
S. Brusca et al., "Water Injection in IC-SI Engines to Control Detonation and to Reduce Pollutant Emissions", SAE Technical Paper No. 2003-01-1912, May 19-22, 2003.

APPARATUS WITH MIXED FUEL SEPARATOR AND METHOD OF SEPARATING A MIXED FUEL

BACKGROUND AND SUMMARY

Engines may use various forms of fuel delivery to provide a desired amount of fuel for combustion in each cylinder. One type of fuel delivery uses a port injector for each cylinder to deliver fuel to respective cylinders. Still another type of fuel delivery uses a direct injector for each cylinder.

Further, engines have been proposed using more than one type of fuel injection. For example, the papers titled "Calculations of Knock Suppression in Highly Turbocharged Gasoline/Ethanol Engines Using Direct Ethanol Injection" and "Direct Injection Ethanol Boosted Gasoline Engine: Biofuel Leveraging for Cost Effective Reduction of Oil Dependence and CO2 Emissions" by Heywood et al. are one example. Specifically, the Heywood et al. papers describe directly injecting ethanol to improve charge cooling effects, while relying on port injected gasoline for providing the majority of combusted fuel over a drive cycle. The ethanol provides increased octane and increased charge cooling due to its higher heat of vaporization compared with gasoline, thereby reducing knock limits on boosting and/or compression ratio. Further, water may be mixed with ethanol and/or used as an alternative to ethanol. The above approaches purport to improve engine fuel economy and increase utilization of renewable fuels.

However, the inventors herein have recognized several issues with such an approach. Specifically, requiring a user to always provide separate fuels (e.g., gasoline and ethanol) can be burdensome to the operator. To simplify use of an engine with more than one type of fuel injection, the inventors herein have recognized that such an approach may be more easily implemented by the use of a mixed fuel in conjunction with a separator disposed between a fuel tank and internal combustion engine, and by the use of a method comprising inputting a mixed fuel containing a hydrocarbon component and an oxygenated component into the separator, separating the fuel in the separator into a first hydrocarbon-enriched fuel fraction and a second oxygenated fuel-enriched fuel fraction, and controlling an amount of the first fuel fraction and an amount of the second fuel fraction provided to the engine based upon an engine operating condition. This approach takes advantage of already available gas/alcohol mixtures, and therefore may allow advantages of multiple injection and/or multiple fuel strategies to be employed without inconveniencing a user.

DETAILED DESCRIPTION

Figure 1:
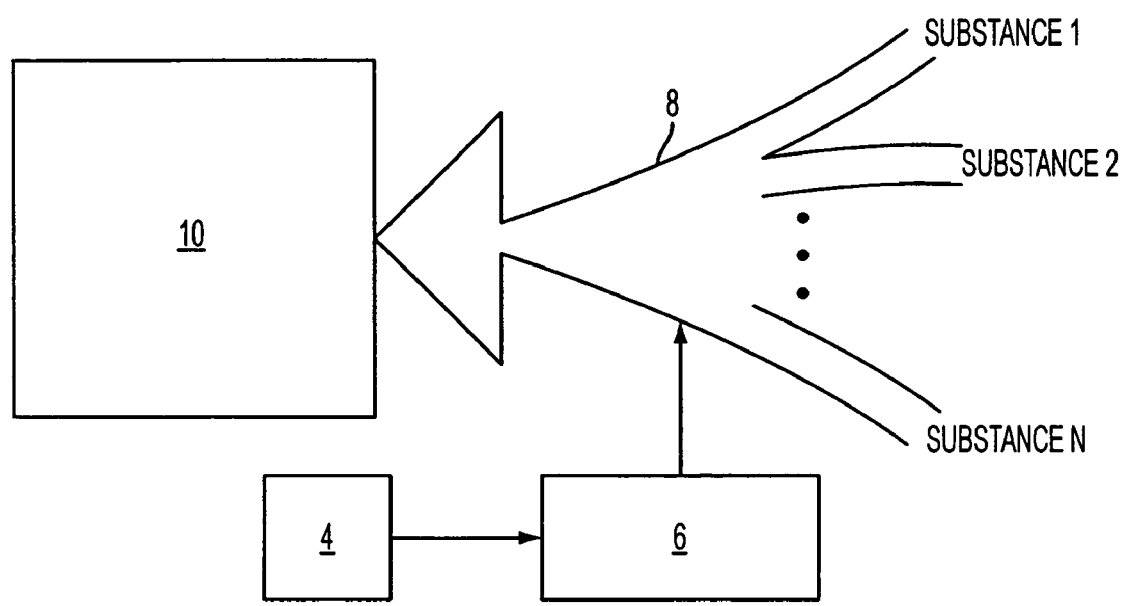
FIG. 1 shows a schematic diagram of a generic engine system.

FIG. 1 shows an engine 10 receiving delivery of a plurality of substances (1, 2, . . . , N) via arrow 8. The various substances may include multiple different fuel blends, injection locations, or various other alternatives. In one example, multiple different substances having different gasoline and/or alcohol and/or water, and/or other compound concentrations may be delivered to the engine, and may be delivered in a mixed state, or separately delivered. Further, the relative amounts and/or ratios of the different substances may be variable controlled by a controller 6 in response to operating conditions, which may be provided via sensor(s) 4.

In one example, the different substances may represent different fuels having different levels of alcohol, including one substance being gasoline and the other being ethanol. In another example, engine 10 may use gasoline as a first substance and an alcohol containing fuel such as ethanol, methanol, a mixture of gasoline and ethanol (e.g., E85 which is approximately 85% ethanol and 15% gasoline), a mixture of gasoline and methanol (e.g., M85 which is approximately 85% methanol and 15% gasoline), a mixture of an alcohol and water, a mixture of an alcohol, water, and gasoline, etc as a second substance. In still another example, the first substance may be a gasoline alcohol blend with a lower alcohol concentration than a gasoline alcohol blend of a second substance. In yet another example, the first substance may be gasoline or diesel fuel, and the second substance may be a dimethyl ether, a methyl ester, a lower alkyl alcohol (such as methanol, ethanol, propanol, or butanol), or a mixture thereof.

In another embodiment, different injector locations may be used for different substances. For example, a single injector (such as a direct injector) may be used to inject a mixture of two substances (e.g., gasoline and an alcohol/water mixture), where the relative amount or ratio of the two or more fuel quantities or substances in the mixture may be varied during engine operation via adjustments made by controller 6 via a mixing valve (not shown), for example. In still another example, two different injectors for each cylinder are used, such as port and direct injectors, each injecting a different substance in different relative amounts as operating conditions vary. In even another embodiment, different sized injectors, in addition to different locations and different substances, may be used. In yet another embodiment, two port injectors with different spray patterns and/or aim points may be used.

Various advantageous results may be obtained by various of the above systems. For example, when using both gasoline and a fuel having alcohol (e.g., ethanol), it may be possible to adjust the relative amounts of the fuels to take advantage of the increased charge cooling of alcohol fuels (e.g., via direct injection) to reduce the tendency of knock (e.g., in response to knock or increased load, increasing a relative amount of alcohol and/water). This phenomenon, combined with increased compression ratio, and/or boosting and/or engine downsizing, can then be used to obtain large fuel economy benefits (by reducing the knock limitations on the engine), while allowing engine operation on gasoline at lighter loads when knock is not a constraint. The knock suppression benefits offered by this phenomenon may be significantly larger than the benefits offered by the dual injection of hydrocarbon fuels with different octane ratings. However, when combusting a mixture having alcohol, the likelihood of pre-ignition may be increased under certain operating conditions. As such, in one example, by utilizing water instead of or mixed into the substance having alcohol, it may be possible to reduce the likelihood of pre-ignition, while still taking advantage of increased charge cooling effects and the availability of alcohol containing fuels.

Additional details of engine, transmission, and/or vehicle control approaches are described herein, as well as in U.S. patent application Ser. No. 11/384,111, titled "CONTROL FOR KNOCK SUPPRESSION FLUID SEPARATOR IN A MOTOR VEHICLE", by Thomas G. Leone, filed Mar. 17, 2006, the entire contents of which are incorporated herein by reference for all purposes.

Figure 2:
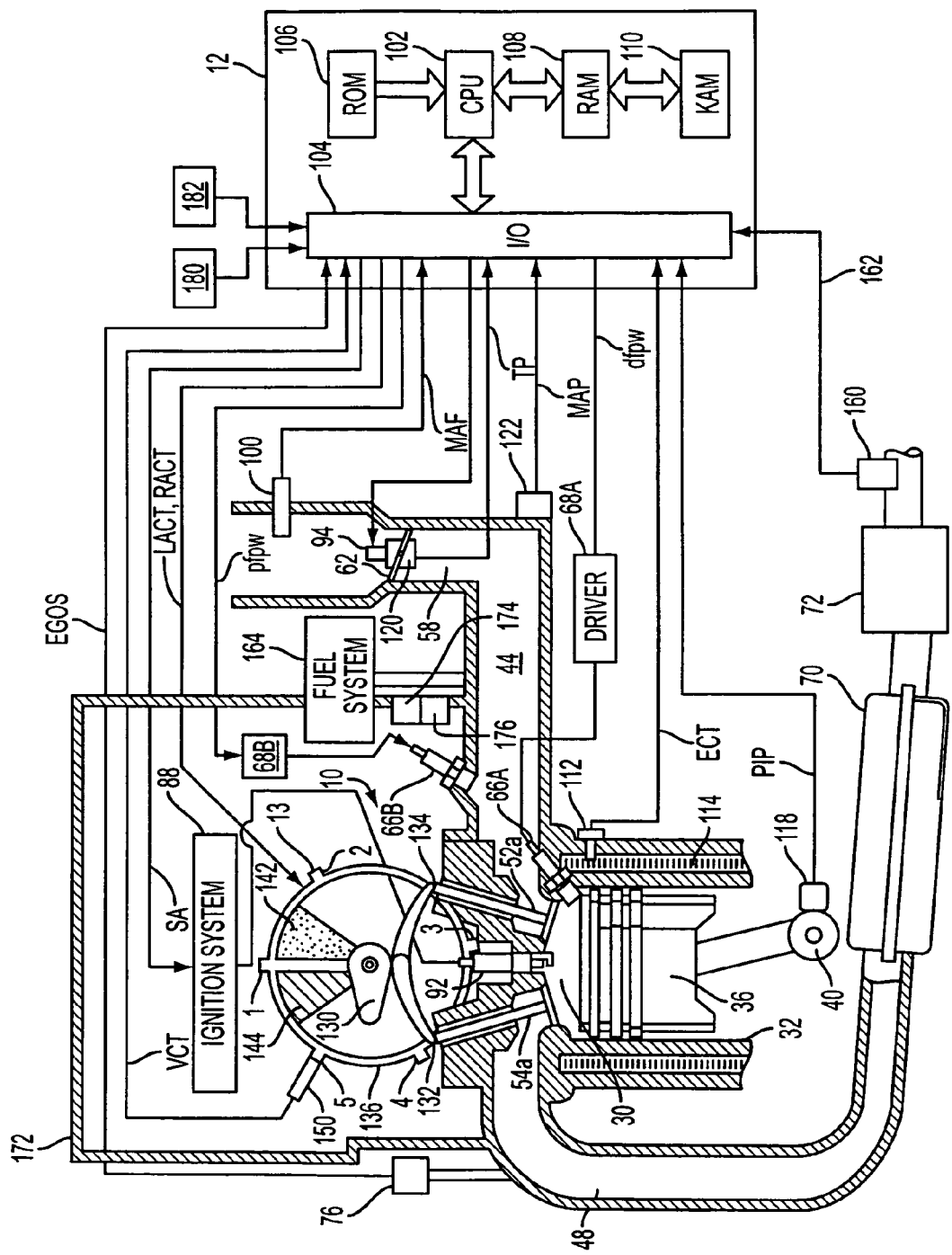
FIG. 2 shows a partial view of an exemplary embodiment of an engine.

Referring now to FIG. 2, it shows one cylinder of a multi-cylinder engine, as well as the intake and exhaust path connected to that cylinder. Further, FIG. 2 shows one example fuel system with two fuel injectors per cylinder, for at least one cylinder. In one embodiment, each cylinder of the engine may have two fuel injectors. The two injectors may be configured in various locations, such as two port injectors, one port injector and one direct injector (as shown in FIG. 2), or others.

Also, as described herein, there are various configurations of the cylinders, fuel injectors, and exhaust system, as well as various configurations for the fuel vapor purging system and exhaust gas oxygen sensor locations.

Continuing with FIG. 2, it shows a multiple injection system, where engine 10 has both direct and port fuel injection, as well as spark ignition. Internal combustion engine 10, comprising a plurality of combustion chambers, is controlled by electronic engine controller 12. Combustion chamber 30 of engine 10 is shown including combustion chamber walls 32 with piston 36 positioned therein and connected to crankshaft 40. A starter motor (not shown) may be coupled to crankshaft 40 via a flywheel (not shown), or alternatively direct engine starting may be used.

In one particular example, piston 36 may include a recess or bowl (not shown) to help in forming stratified charges of air and fuel, if desired. However, in an alternative embodiment, a flat piston may be used.

Combustion chamber, or cylinder, 30 is shown communicating with intake manifold 44 and exhaust manifold 48 via respective intake valves 52a and 52b (not shown), and exhaust valves 54a and 54b (not shown). Thus, while four valves per cylinder may be used, in another example, a single intake and single exhaust valve per cylinder may also be used. In still another example, two intake valves and one exhaust valve per cylinder may be used.

Combustion chamber 30 can have a compression ratio, which is the ratio of volumes when piston 36 is at bottom center to top center. In one example, the compression ratio may be approximately 9:1. However, in some examples where different fuels are used, the compression ratio may be increased. For example, it may be between 10:1 and 11:1 or 11:1 and 12:1, or greater.

Fuel injector 66A is shown directly coupled to combustion chamber 30 for delivering injected fuel directly therein in proportion to the pulse width of signal dfpw received from controller 12 via electronic driver 68A. While FIG. 2 shows injector 66A as a side injector, it may also be located overhead of the piston, such as near the position of spark plug 92. Such a position may improve mixing and combustion due to the lower volatility of some alcohol based fuels. Alternatively, the injector may be located overhead and near the intake valve to improve mixing.

Fuel and/or water may be delivered to fuel injector 66A by a high pressure fuel system (not shown) including a fuel tank, fuel pumps, and a fuel rail. Alternatively, fuel and/or water may be delivered by a single stage fuel pump at lower pressure, in which case the timing of the direct fuel injection may be more limited during the compression stroke than if a high pressure fuel system is used. Further, while not shown, the fuel tank (or tanks) may (each) have a pressure transducer providing a signal to controller 12.

Fuel injector 66B is shown coupled to intake manifold 44, rather than directly to cylinder 30. Fuel injector 66B delivers injected fuel in proportion to the pulse width of signal pfpw received from controller 12 via electronic driver 68B. Note that a single driver 68 may be used for both fuel injection systems, or multiple drivers may be used. Fuel system 164 is also shown in schematic form delivering vapors to intake manifold 44, where fuel system 164 is also coupled to injectors 66A and 66B (although not shown in this Figure). Various fuel systems and fuel vapor purge systems may be used.

Intake manifold 44 is shown communicating with throttle body 58 via throttle plate 62. In this particular example, throttle plate 62 is coupled to electric motor 94 so that the position of elliptical throttle plate 62 is controlled by controller 12 via electric motor 94. This configuration may be referred to as electronic throttle control (ETC), which can also be utilized during idle speed control. In an alternative embodiment (not shown), a bypass air passageway is arranged in parallel with throttle plate 62 to control inducted airflow during idle speed control via an idle control by-pass valve positioned within the air passageway.

Exhaust gas sensor 76 is shown coupled to exhaust manifold 48 upstream of catalytic converter 70 (where sensor 76 can correspond to various different sensors). For example, sensor 76 may be any of many known sensors for providing an indication of exhaust gas air/fuel ratio such as a linear oxygen sensor, a UEGO, a two-state oxygen sensor, an EGO, a HEGO, or an HC or CO sensor. In this particular example, sensor 76 is a two-state oxygen sensor that provides signal EGO to controller 12 which converts signal EGO into two-state signal EGOS. A high voltage state of signal EGOS indicates exhaust gases are rich of stoichiometry and a low voltage state of signal EGOS indicates exhaust gases are lean of stoichiometry. Signal EGOS may be used to advantage during feedback air/fuel control to maintain average air/fuel at stoichiometry during a stoichiometric homogeneous mode of operation. Further details of air-fuel ratio control are included herein.

Distributorless ignition system 88 provides ignition spark to combustion chamber 30 via spark plug 92 in response to spark advance signal SA from controller 12.

Controller 12 may cause combustion chamber 30 to operate in a variety of combustion modes, including a homogeneous air/fuel mode and/or a stratified air/fuel mode by controlling injection timing, injection amounts, spray patterns, etc. Further, combined stratified and homogenous mixtures may be formed in the chamber. In one example, stratified layers may be formed by operating injector 66A during a compression stroke. In another example, a homogenous mixture may be formed by operating one or both of injectors 66A and 66B during an intake stroke (which may be open valve injection). In yet another example, a homogenous mixture may be formed by operating one or both of injectors 66A and 66B before an intake stroke (which may be closed valve injection). In still other examples, multiple injections from one or both of injectors 66A and 66B may be used during one or more strokes (e.g., intake, compression, exhaust, etc.). Even further examples may be where different injection timings and mixture formations are used under different conditions, as described below.

Controller 12 can control the amount of fuel delivered by fuel injectors 66A and 66B so that the homogeneous, stratified, or combined homogenous/stratified air/fuel mixture in chamber 30 can be selected to be at stoichiometry, a value rich of stoichiometry, or a value lean of stoichiometry.

While FIG. 2 shows two injectors for the cylinder, one being a direct injector and the other being a port injector, in an alternative embodiment two port injectors for the cylinder may be used, along with open valve injection, for example.

Emission control device 72 is shown positioned downstream of catalytic converter 70. Emission control device 72 may be a three-way catalyst or a NOx trap, or combinations thereof.

Controller 12 is shown as a microcomputer, including microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40; and throttle position TP from throttle position sensor 120; absolute Manifold Pressure Signal MAP from sensor 122; an indication of knock from knock sensor 182; and an indication of absolute or relative ambient humidity from sensor 180. Engine speed signal RPM is generated by controller 12 from signal PIP in a conventional manner and manifold pressure signal MAP from a manifold pressure sensor provides an indication of vacuum, or pressure, in the intake manifold. During stoichiometric operation, this sensor can give an indication of engine load. Further, this sensor, along with engine speed, can provide an estimate of charge (including air) inducted into the cylinder. In one example, sensor 118, which is also used as an engine speed sensor, produces a predetermined number of equally spaced pulses every revolution of the crankshaft.

Continuing with FIG. 2, a variable camshaft timing system is shown. Specifically, camshaft 130 of engine 10 is shown communicating with rocker arms 132 and 134 for actuating intake valves 52a, 52b and exhaust valves 54a, 54b. Camshaft 130 is directly coupled to housing 136. Housing 136 forms a toothed wheel having a plurality of teeth 138. Housing 136 is hydraulically coupled to crankshaft 40 via a timing chain or belt (not shown). Therefore, housing 136 and camshaft 130 rotate at a speed substantially equivalent to the crankshaft. However, by manipulation of the hydraulic coupling as will be described later herein, the relative position of camshaft 130 to crankshaft 40 can be varied by hydraulic pressures in advance chamber 142 and retard chamber 144. By allowing high pressure hydraulic fluid to enter advance chamber 142, the relative relationship between camshaft 130 and crankshaft 40 is advanced. Thus, intake valves 52a, 52b and exhaust valves 54a, 54b open and close at a time earlier than normal relative to crankshaft 40. Similarly, by allowing high pressure hydraulic fluid to enter retard chamber 144, the relative relationship between camshaft 130 and crankshaft 40 is retarded. Thus, intake valves 52a, 52b, and exhaust valves 54a, 54b open and close at a time later than normal relative to crankshaft 40.

While this example shows a system in which the intake and exhaust valve timing are controlled concurrently, variable intake cam timing, variable exhaust cam timing, dual independent variable cam timing, or fixed cam timing may be used. Further, variable valve lift may also be used. Further, camshaft profile switching may be used to provide different cam profiles under different operating conditions. Further still, the valvetrain may be roller finger follower, direct acting mechanical bucket, electromechanical, electrohydraulic, or other alternatives to rocker arms.

Continuing with the variable cam timing system, teeth 138, being coupled to housing 136 and camshaft 130, allow for measurement of relative cam position via cam timing sensor 150 providing signal VCT to controller 12. Teeth 1, 2, 3, and 4 are preferably used for measurement of cam timing and are equally spaced (for example, in a V-8 dual bank engine, spaced 90 degrees apart from one another) while tooth 5 is preferably used for cylinder identification, as described later herein. In addition, controller 12 sends control signals (LACT, RACT) to conventional solenoid valves (not shown) to control the flow of hydraulic fluid either into advance chamber 142, retard chamber 144, or neither.

Relative cam timing can be measured in a variety of ways. In general terms, the time, or rotation angle, between the rising edge of the PIP signal and receiving a signal from one of the plurality of teeth 138 on housing 136 gives a measure of the relative cam timing. For the particular example of a V-8 engine, with two cylinder banks and a five-toothed wheel, a measure of cam timing for a particular bank is received four times per revolution, with the extra signal used for cylinder identification.

Sensor 160 may also provide an indication of oxygen concentration in the exhaust gas via signal 162, which provides controller 12 a voltage indicative of the O2 concentration. For example, sensor 160 can be a HEGO, UEGO, EGO, or other type of exhaust gas sensor. Also note that, as described above with regard to sensor 76, sensor 160 can correspond to various different sensors.

As described above, FIG. 2 merely shows one cylinder of a multi-cylinder engine, and it is understood that each cylinder has its own set of intake/exhaust valves, fuel injectors, spark plugs, etc.

Also, in the example embodiments described herein, the engine may be coupled to a starter motor (not shown) for starting the engine. The starter motor may be powered when the driver turns a key in the ignition switch on the steering column, for example. The starter is disengaged after engine starting, for example, by engine 10 reaching a predetermined speed after a predetermined time.

Continuing with FIG. 2, an exhaust gas recirculation system is shown. Exhaust gas is delivered to intake manifold 44 by a conventional EGR tube 172 communicating with exhaust manifold 48, EGR valve assembly 174, and EGR orifice 176. Alternatively, tube 172 could be an internally routed passage in the engine that communicates between exhaust manifold 48 and intake manifold 44. As will be described in further detail herein, EGR tube 172 (or another EGR tube or a branch (not shown) of EGR tube 172) may be configured to assist the fuel system in the separation of a mixed fuel.

As noted above, engine 10 may operate in various modes, including lean operation, rich operation, and "near stoichiometric" operation. "Near stoichiometric" operation can refer to oscillatory operation around the stoichiometric air fuel ratio. Typically, this oscillatory operation is governed by feedback from exhaust gas oxygen sensors. In this near stoichiometric operating mode, the engine may be operated within approximately one air-fuel ratio of the stoichiometric air-fuel ratio.

Feedback air-fuel ratio control may be used for providing the near stoichiometric operation. Further, feedback from exhaust gas oxygen sensors can be used for controlling air-fuel ratio during lean and during rich operation. In particular, a switching type, heated exhaust gas oxygen sensor (HEGO) can be used for stoichiometric air-fuel ratio control by controlling fuel injected (or additional air via throttle or VCT) based on feedback from the HEGO sensor and the desired air-fuel ratio. Further, a UEGO sensor (which provides a substantially linear output versus exhaust air-fuel ratio) can be used for controlling air-fuel ratio during lean, rich, and stoichiometric operation. In this case, fuel injection (or additional air via throttle or VCT) can be adjusted based on a desired air-fuel ratio and the air-fuel ratio from the sensor. Further still, individual cylinder air-fuel ratio control could be used, if desired. Adjustments may be made with injector 66A, 66B, or combinations thereof depending on various factors, to control engine air-fuel ratio.

Also note that various methods can be used to maintain the desired torque such as, for example, adjusting ignition timing, throttle position, variable cam timing position, exhaust gas recirculation amount, and number of cylinders carrying out combustion. Further, these variables can be individually adjusted for each cylinder to maintain cylinder balance among all the cylinders. While not shown in FIG. 2, engine 10 may be coupled to various boosting devices, such as a supercharger or turbocharger. On a boosted engine, desired torque may also be maintained by adjusting wastegate and/or compressor bypass valves.

Figure 3:
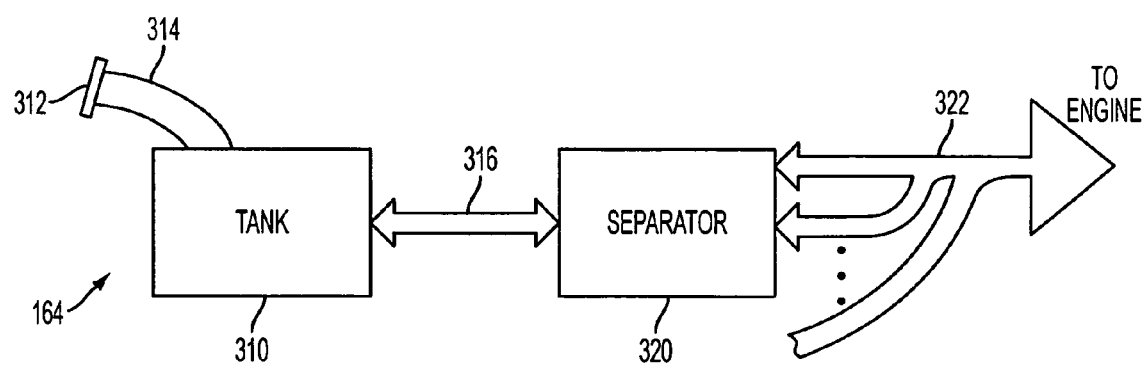
FIG. 3 shows an exemplary embodiment of a fuel system with a fuel separator.

Referring now to FIG. 3, an example fuel system layout is provided with fuel tank 310 having fuel fill cap 312. The system is configured to receive a fuel mixture through the fill line 314 and into tank 310, where the mixture may be a gasoline/alcohol mixture, a gasoline/alcohol/water mixture, or various others such as noted herein, including, a gasoline/ethanol mixture such as E10, for example. The fuel mixture in tank 310 may be transported to a separator system 320 via a transport system, shown by double arrow 316. The transport system 316 may be a one way transport, e.g., transporting the fuel mixture to the separator 320, or may enable two-way transportation, such as return lines from the separator or downstream fuel system back to the tank 310. The transport system 316 may include pumps, valves, multiple separate lines, or various other components, such as described below herein with regard to example systems. Further, while FIG. 3 shows the transport system 316 external to tank 310, system 316 along with separator 320 and/or portions of transport system 322 may also be located within or at least partially within tank 310.

Continuing with FIG. 3, it also shows downstream transport system 322 located between separator 320 and the engine (not shown). Transport system 322 is shown having at least two separate lines coupled to the separator to transport different amounts of substances or fuels with different constituents to the engine depending on operating conditions. Transport system 322 may maintain the different fuels separate in delivering the fuels to the engine, or may mix the fuels for co-delivery to the engine, as illustrated in FIG. 3. Further, like system 316, system 322 may include pumps, valves, multiple separate lines, return lines, or various other components, such as described below herein with regard to example systems.

Separator system 320 is configured to allow two or more components in the fuel mixture stored in tank 310 to be separated and provided separately to engine 10, thereby permitting the advantages of dual or mixed injection strategies to be employed without causing inconvenience to a user.

Figure 4:
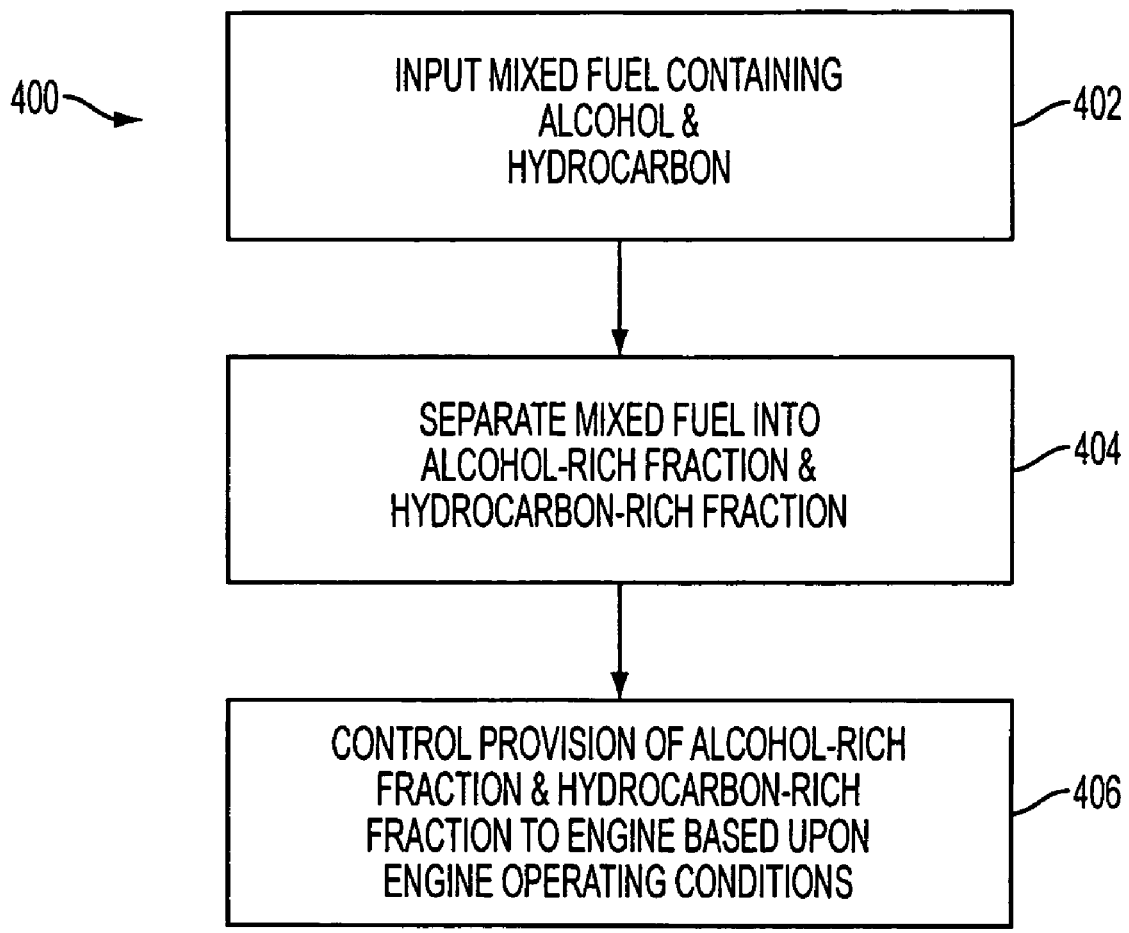
FIG. 4 shows a flow diagram of an exemplary embodiment of a method of operating an engine.

FIG. 4 illustrates one exemplary embodiment of a method 400 of operating engine 10 via a fuel separation/mixed injection strategy. First, method 400 includes inputting a mixed fuel into tank 310, or receiving the mixed fuel into the tank. In the embodiment of FIG. 4, the mixed fuel contains a hydrocarbon component (such as gasoline) and an alcohol component (including but not limited to ethanol or methanol). However, it will be appreciated that any suitable mixed fuel may be used, including but not limited to other polar and/or oxygenated fuels such as ethers and esters and other nonpolar and/or hydrocarbon fuels such as diesel.

Next, method 400 includes separating, at 404, the mixed fuel into a hydrocarbon-enriched fraction and an alcohol-enriched fraction. As used herein, the terms "hydrocarbon-enriched" refers to the volume of fuel after separation from which either the alcohol was removed, or the volume of fuel containing hydrocarbons removed from the mixed fuel, depending upon whether the separator is configured to extract the hydrocarbon or alcohol components. Likewise, the term "alcohol-enriched" refers to the volume of fuel after separation from which either the hydrocarbon was removed, or the volume of fuel containing alcohols (or other oxygenated or polar fuels) removed from the hydrocarbon portion of the mixed fuel, depending upon the separation mechanism employed. It will be appreciated that the relative concentrations of the alcohol and hydrocarbon components of the "hydrocarbon-enriched" or "alcohol-enriched" fractions may be either higher or lower than the other respective component of those fractions. Furthermore, the term "fraction" is used herein merely to denote a volume of fuel after a separation process, and does not imply that any particular type of separation process is employed.

After separating the mixed fuel into at least the alcohol-enriched and hydrocarbon-enriched fractions, method 400 next includes controlling the provision of fuel from the alcohol-enriched fraction and fuel from the hydrocarbon-enriched fraction to engine 10 based upon an engine operating condition. For example, if engine knock is detected, a greater relative amount of fuel from the alcohol-enriched fraction may be provided to reduce knock. Furthermore, in a fuel system with more than two inputs, water may be added from a third input to help prevent pre-ignition. Alternatively, the alcohol-enriched fraction may contain a quantity of water to help prevent pre-ignition. As another example, a greater relative amount of fuel from the hydrocarbon-enriched fraction may be provided to the engine as an engine load increases, thereby providing a greater amount of energy to the engine. It will be appreciated that these are merely exemplary methods of controlling the provision of the alcohol-enriched fuel fraction and the hydrocarbon-enriched fuel fraction to engine 10, and that the relative amounts (or ratio) of fuels from these fractions may be adjusted based upon any other suitable engine operating conditions or for any other suitable purpose. Other examples include, but are not limited to, the reduction of emissions and/or the enhancement of fuel economy.

Figure 5:
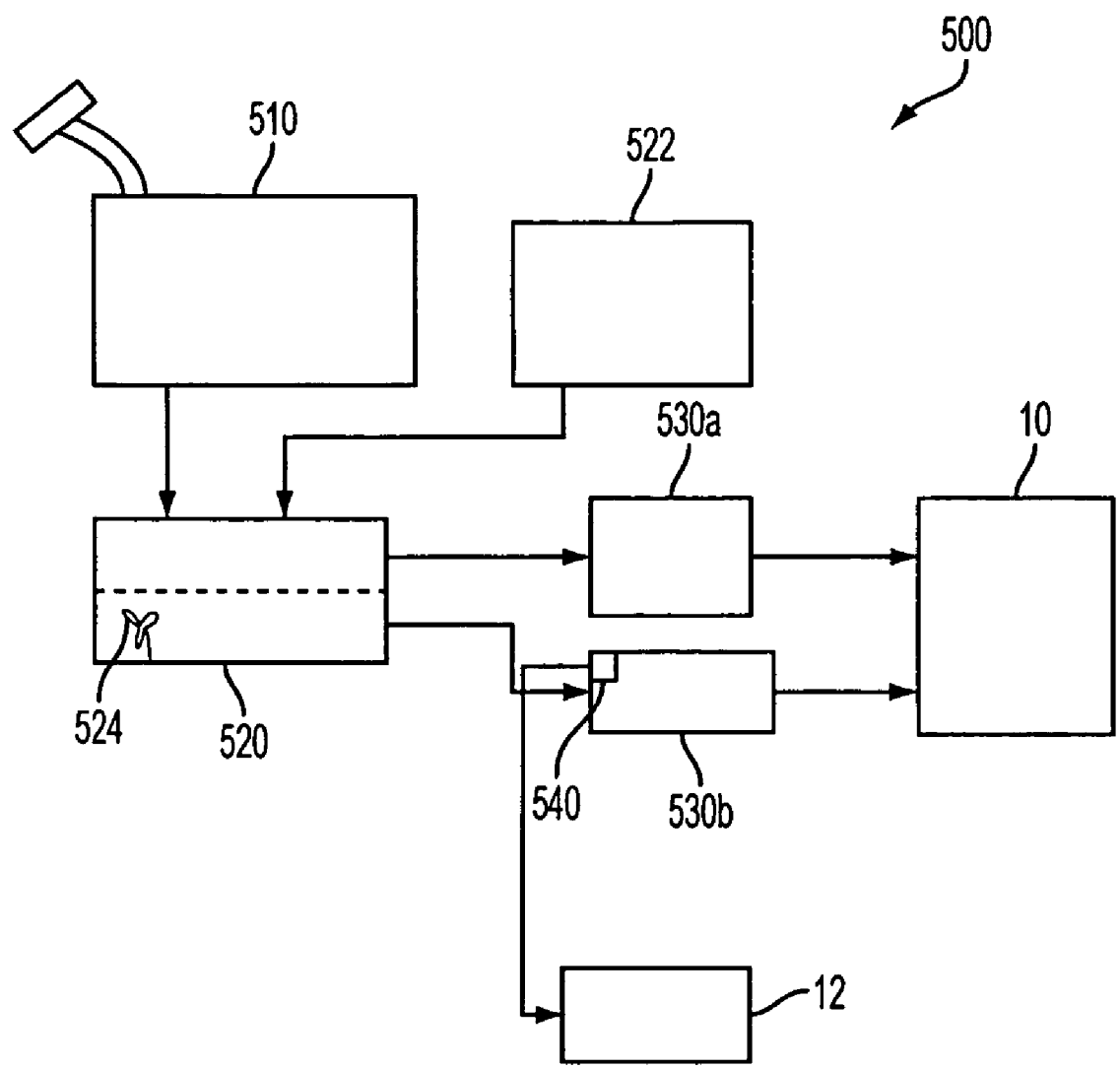
FIG. 5 shows a block diagram of another exemplary embodiment of a fuel separator with a fuel separator.

Any suitable methods and/or structures may be used to separate a mixed fuel in a fuel system according to the present disclosure. For example, in some embodiments, an aqueous extraction may be used to remove fuel components soluble in water (such as methanol, ethanol, etc.) from fuel components not soluble in water. FIG. 5 shows, generally at 500, an exemplary embodiment of a fuel system having an aqueous extraction system for separating an alcohol (or other polar fuel component) from a hydrocarbon fuel component. Fuel system 500 includes a fuel tank 510 for receiving a fuel input by a user, and an extraction tank 520 in fluidic communication with and configured to receive mixed fuel from tank 510. As used herein, the term "in fluidic communication with" (and variations thereof) refers to the existence of a fluid path between components, and neither implies nor excludes the existence of any intermediate structures or components, nor implies that a path is always open or available for fluid flow.

Fuel system 500 also includes an extraction fluid source 522 in fluid communication with extraction tank 520 for the extraction of a fuel component from the mixed fuel. Extraction fluid source may be configured to provide any suitable extraction fluid to extraction tank 520 in any suitable manner. Suitable extraction fluids include those fluids which are miscible with the component or components of the mixed fuel to be extracted and are immiscible with the component or components of the mixed fuel not to be extracted. Where the mixed fuel contains a lower alkyl alcohol and gasoline, an example of a suitable extraction fluid is water. In one embodiment, extraction fluid source 522 includes a holding tank to which water may be periodically added, for example, by a user or during a vehicle servicing. Alternatively, extraction fluid source 522 may include a condenser that condenses water vapor from air, exhaust, etc. For example, a collector may be located within or coupled to an air-conditioning unit in order to collect condensed water.

Extraction tank 520 may include a mixer or agitator (depicted schematically at 524) to ensure that the extraction fluid and mixed fuel are well mixed for the extraction process. Alternatively, extraction tank 520 may not include a mixer, and instead may rely on momentum changes in driving (for example, hitting bumps, acceleration/deceleration, etc.) to help mix the extraction fluid and the mixed fuel. Furthermore, in an alternative embodiment, extraction fluid may be added to the mixed fuel in a conduit that is upstream from and leads to the extraction tank. The fluids may mix while flowing in the conduit and upon entering the extraction tank 520. In either of these embodiments, after mixing, the fluids may be allowed to separate while in the extraction tank. After mixing, the aqueous phase containing the alcohol-enriched fraction settles to the bottom of extraction tank 520 and the hydrocarbon-enriched fraction rises to the top of the alcohol-enriched fraction. To separate the two fractions, a first outlet for the alcohol-enriched fraction may be provided at a location in extraction tank 520 at a level above the border between the alcohol-enriched fraction and the hydrocarbon-enriched fraction to allow the hydrocarbon-enriched fraction to be removed, and a second outlet may be provided at a level below this border (for example, at the bottom of extraction tank 520) to allow the alcohol-enriched fraction to be removed.

After removal from extraction tank 520, either or both of the hydrocarbon-enriched fraction and the alcohol-enriched fraction may be stored in a storage tank (shown at 530a and 530b, respectively) before being provided to engine 10. Alternatively, either or both of the hydrocarbon-enriched fraction and the alcohol-enriched fraction may be provided directly to engine, without storage in a storage tank, via injectors 66A, 66B or via intake manifold 44. A sensor 540 may be provided in communication with controller 12 to output a signal proportional to an amount of alcohol present in the extraction fluid. From this signal, controller 12 may determine a calorie content per unit volume of the alcohol-enriched fraction for use in controlling the addition of the two fuel fractions to the engine. Suitable sensors for use as sensor 540 include, but are not limited to, refractive index sensors.

As one example, the relative amounts of separate substances delivered to the engine may be varied depending on the composition of the hydrocarbon-enriched fraction and the alcohol-enriched fraction generated by the separator. In this, it may be possible to provide consistent levels of knock reduction while also providing desired engine torque, thus compensating for variation in caloric content and knock suppression effectiveness.

Figure 6:
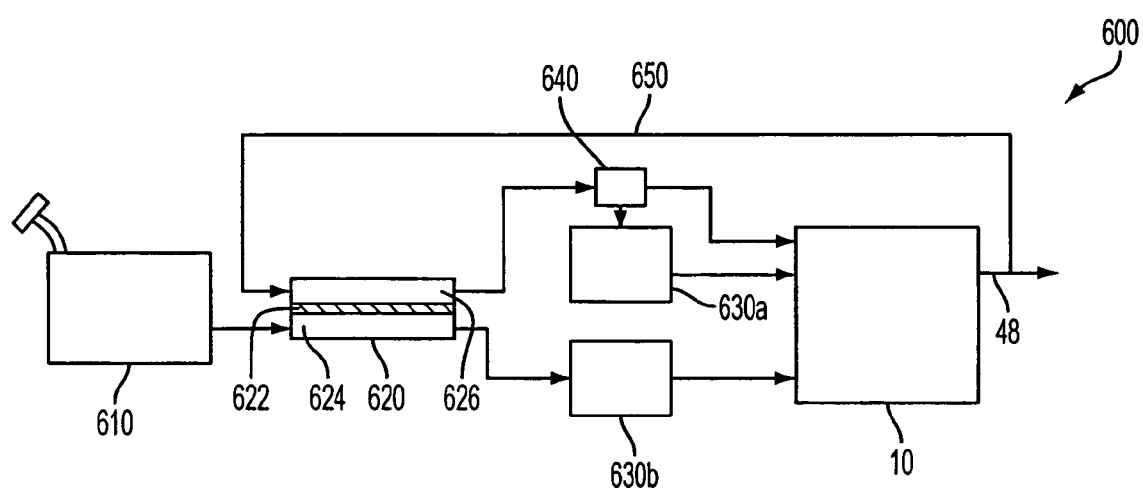
FIG. 6 shows a block diagram of another exemplary embodiment of a fuel system with a fuel separator.

FIG. 6 shows, generally at 600, another exemplary embodiment of a fuel system and separator. Fuel system 600 includes a fuel tank 610, a separator 620, a first fuel fraction storage tank 630a, a second fuel fraction storage tank 630b, and a condenser 640. Fuel system 600 also includes an exhaust gas recirculation (EGR) tube 650 configured to recirculate exhaust gases from the engine exhaust manifold 48 into separator 620. Exhaust gas recirculation tube 650 may be the same as exhaust gas recirculation tube 170 shown in FIG. 2, or may be a separate tube or a branch of tube 170.

Separator 620 includes a barrier 622 separating a first passageway 624 from a second passageway 626. Barrier 622 is made at least partially of a material or materials that selectively transports one component of the mixed fuel at a higher rate than, or even to the substantial exclusion of, the other component of the mixed fuel. The extracted fuel component crosses barrier 622 into second passageway 626, while the unextracted fuel components remain in first passageway 624. In this manner, a first fuel fraction (either hydrocarbon-enriched or alcohol-enriched, depending upon whether the materials used for barrier 622 selectively pass hydrocarbons or alcohols) may be collected at the outlet of first passageway, and a second fuel fraction may be collected at the outlet of the second passageway. The recirculated exhaust gases provided by exhaust gas recirculation tube 650 may be directed to flow across the opposite side of barrier 622 as the mixed fuel input, thereby transporting fuel components that diffuse through barrier 622 away from barrier 622. This may improve the rate of fuel transport across the barrier. Furthermore, the recirculated exhaust gas also may be used to heat the separator, which may also help to drive the pervaporation of the extracted fuel component across the membrane, thereby increasing fuel transport rates across barrier 622.

Condenser 640 may be used to condense the extracted fuel component out of the recirculated exhaust gas stream after pervaporation, along with water vapor and any other condensable exhaust components. The condensed extracted fuel may then be collected in first fuel fraction storage tank 630a for later use by engine 10. The recirculated exhaust gases may also be provided to an intake manifold of engine 10 as shown in FIG. 6, or may be emitted from the engine as exhaust. It will be appreciated that the recirculated exhaust gas may be directed through other components either before or after flowing through the separator. One example of such other components is an EGR cooler, which may be positioned either upstream or downstream of separator 620.

Barrier 622 may be formed from any suitable material or materials. Suitable materials include materials that selectively pass one type of fuel within the mixed fuel to the exclusion or substantial exclusion of the other type or types of fuels in the mixed fuel, that pass one type of fuel at a higher rate than the other types of fuels, or that possess any other property that allows the enrichment of a selected fuel type within the mixed fuel. Selectivity may be based upon any suitable differences in physical properties between the desired fuel components. Examples include, but are not limited to, relative polarities of the fuel components, chemical reactivity and/or surface absorption characteristics of the fuel components with the surfaces of the selective material, the molecular size of the fuel components relative to a pore size of the selective material, and combinations of these properties.

In one embodiment, the barrier 622 comprises a material with a chemical or physical affinity for a selected fuel component in the mixed fuel. For example, where the mixed fuel includes ethanol (or other lower alcohol) and gasoline, a polymeric material with an affinity for polar molecules may be used to selectively transport the ethanol molecules to the substantial exclusion of hydrocarbons. Examples of suitable polymer materials with selectivity for lower alcohols such as methanol, ethanol and propanol include, but are not limited to, polyvinyl alcohol, polysulfone, poly(ether ether ketone), polydimethyl siloxane, and cellulose triacetate. These materials may show selective transport over polar molecules over the hydrocarbon components of gasoline, which tend to show more nonpolar behavior. Such materials may also be effective in selectively transporting other oxygenated or polar fuel components that may be used in a mixed fuel, such as ethers and esters. In some embodiments, the polymer material may be supported by a ceramic, metal or other rigid support on which the polymer is deposited as a thin or thick film. In other embodiments, the polymer material may comprise the bulk of the selective barrier.

In another embodiment, selective barrier 622 may include a material that selectively passes a lower alcohol component of a mixed fuel over a hydrocarbon component based upon size selectivity. The smallest majority components in gasoline may include isooctane and heptane, and other small components found in lower concentrations may include branched and cyclic hexanes, pentane and butane. In comparison, ethanol is smaller than these hydrocarbons. Therefore, a porous material such as a zeolite or other porous metal oxide, or even porous metals, may be used to transport the smaller ethanol molecule at a higher rate than the larger hydrocarbons. Any suitable porous material may be used. In one specific embodiment, zeolite-Y may be used. Furthermore, the pores of the metal oxide may be chemically modified to change or enhance the selective transport properties of the material. For example, where the porous material is a zeolite, ion exchange may be used to increase the polarity and/or modify the acidity within the pores to enhance the transport of alcohols through the material. Likewise, if it desired to extract the hydrocarbons, rather than alcohols, from a mixed fuel, an alkyl siloxane or other siloxane having organic functional groups may be chemically reacted with the silicon oxide sites within the zeolite pores. In this manner, the siloxy groups of the organic siloxane may chemically bond to the zeolite within the pores, and the organic functional groups form a nonpolar surface, thereby allowing nonpolar molecules to diffuse through the material while inhibiting the transport of polar materials. Such a surface modification may also be used to decrease an amount of the transported fuel component that remains adsorbed to the surfaces of the pores, rather than being transported through the pores. Likewise, the pores may be coated with a polymer material that has an affinity for either the polar or nonpolar components of the mixed fuel. Examples of polymer coatings that may enhance the selectivity of a material to pass an alcohol to the substantial exclusion of a nonpolar hydrocarbon include, but are not limited to, polyvinylalcohol, polydimethyl siloxane, poly (amide-b-ether) copolymer, polyether sulfone, and poly (ether ether ketone). It will be appreciated that these are merely examples of potential porous materials and modifications that can be made to the porous materials, and that any other suitable materials and/or material modifications may be used.

Figure 7:
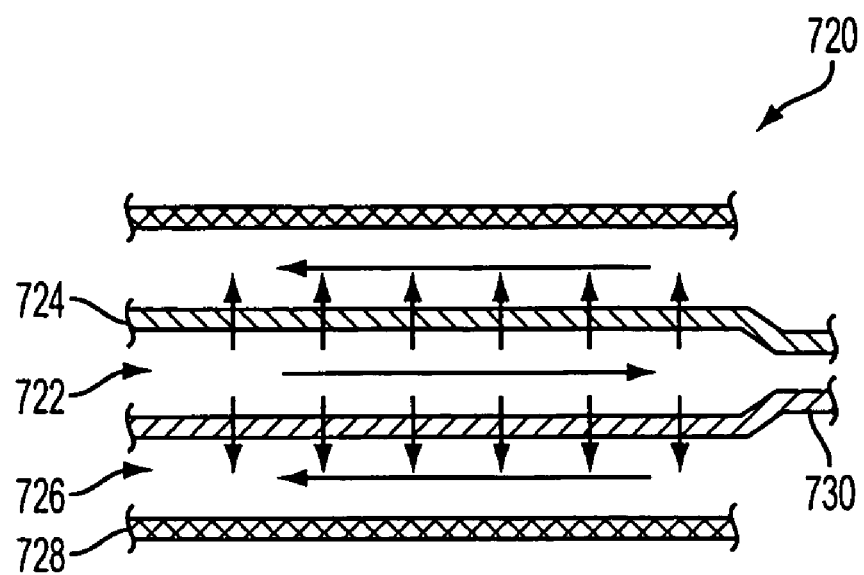
FIG. 7 shows a sectional view of an exemplary embodiment of a fuel separator.

Separator 620 may have any suitable configuration for performing the separation of the mixed fuel. FIG. 7 shows, generally at 720, one exemplary embodiment of a suitable separator configuration. Separator 720 includes an inner passageway 724 defined by a selective barrier 722, and an outer passageway 726 defined by an outer wall 728. Inner passageway 724 may be configured to receive a flow of mixed fuel from a fuel tank. As illustrated by the arrows in FIG. 7, the extracted component of the mixed fuel is transported across the membrane from the inner passageway to the outer passageway.

Inner passageway 724 may include a restriction 730 or narrowing to slow fluid flow through inner passageway 724 and to increase the pressure of the mixed fuel on the selective barrier 722. This may help to improve transport rates and recovery yields of the extracted fuel component. Additionally, pumps and/or other components may be used to provide additional pressure control to optimize the pressure of the mixed fuel in the separator to promote transport of the desired fuel component across the selective barrier. Such systems may allow the pressure be adjusted from atmospheric pressure (ambient pressure) to several thousand pounds per square inch.

The extracted fuel component may be recovered in outer passageway 728 as a liquid, or as a gas where barrier 722 is a pervaporation membrane. Where the extracted fuel component is recovered as a gas, it may be converted to a liquid phase for storage in a condenser as illustrated in FIG. 6, or may be provided to an injector or intake manifold in the gas phase without condensation. Furthermore, as illustrated in FIG. 6, recirculated exhaust gas may be directed through outer passageway 728 to heat separator 720 and/or to help collect extracted fuel components, thereby increasing fuel transport rates through selective barrier 722. Alternatively, another extraction fluid, such as water from a storage reservoir or condenser, may be flowed through outer passageway 728 to collect the extracted fuel component and to help increase transport rates. In these embodiments, the water or other extraction fluid may be heated before passing through separator 720, or separator 720 may be heated from another source (for example, an electrical heater or recirculated exhaust gas flowed around the exterior of separator 720).

The recirculated exhaust gases (or other extraction fluid) may be passed through outer passageway 728 in a direction opposite the flow of the mixed fuel through inner passageway 724 as illustrated in FIG. 7, or may be flowed through in a similar direction. Furthermore, in an alternate embodiment, the mixed fuel may be provided to outer passageway 728, and the recirculated exhaust gas or other extraction fluid may be provided to the inner passageway. In these embodiments, outer passageway 728 may include a restriction to slow the flow of the mixed fuel and to increase the pressure of the mixed fuel on selective barrier 722. The restriction may be adjustable in diameter, circumference and/or cross-sectional area to allow the pressure of the mixed fuel on the selective barrier 722 to be adjusted as desired.

Figure 8:
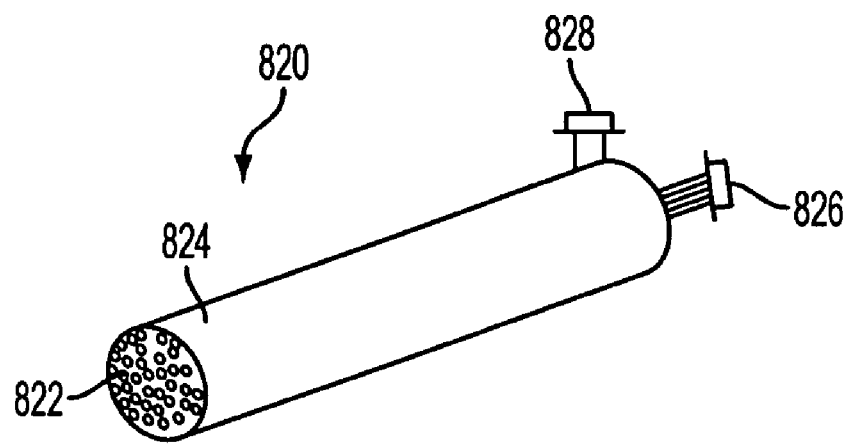
FIG. 8 shows a sectional view of another exemplary embodiment of a fuel separator.

FIG. 8 shows another exemplary embodiment of a separator, generally at 820. Instead of having a single tubular selective barrier surrounded by an outer wall, separator 820 includes a plurality of tubular selective barriers 822 defining a plurality of inner passageways. The plurality of tubular barriers 822 are contained within a single tubular outer wall 824, which defines a single outer passageway. A first input 826 is provided for flowing a fluid through the plurality of tubular barriers 822, and a second input 828 is provided for flowing a fluid through the interior of tubular outer wall 824 and around the exteriors of the plurality of tubular inner barriers 822. In this manner, the surface area of the selective transport barrier may be increased relative to the embodiment of FIG. 6. Examples of such extraction systems include water-permeable selective barriers sold under the trade name PERMAPURE by Permapure, LLC of Toms River, N.J.

Figure 9:
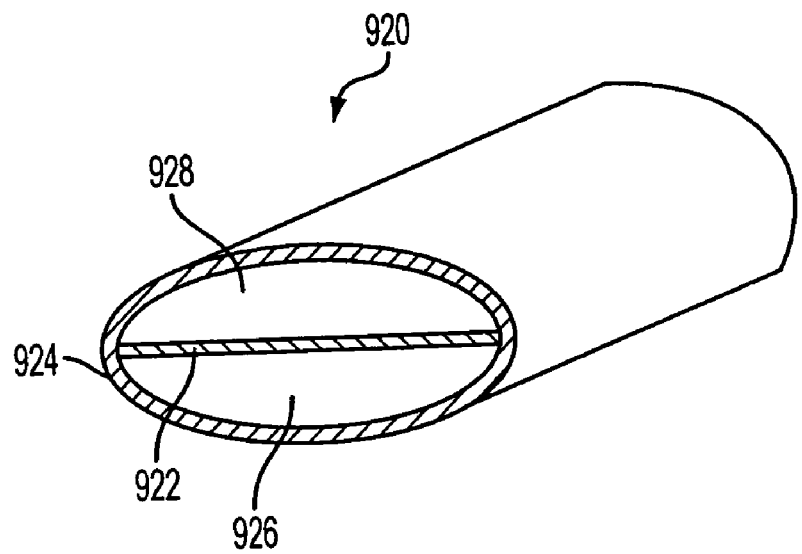
FIG. 9 shows a sectional view of another exemplary embodiment of a fuel separator.

FIG. 9 shows another exemplary embodiment of a separator, generally at 920. Separator 920 includes a selective barrier 922 and an outer wall 924 that divides an interior defined by the outer wall into a first passageway 926 and a second passageway 928. Selective barrier 922 takes the form of a linear membrane disposed across the interior of outer wall 924. Mixed fuel may be provided to one of first passageway 926 and second passageway 928, and an extracted fuel component may be recovered from the other of first passageway 926 and 928. Depending upon the material used for selective barrier 922, selective barrier 922 may include a rigid support material (for example, a metal or ceramic material) that supports the selective barrier material. Such a rigid barrier material may help to support the selective barrier material against elevated pressures that may be used in the fuel separation process. In other embodiments, the selective barrier material may be sufficiently strong and rigid to allow the omission of a support.

Figure 10:
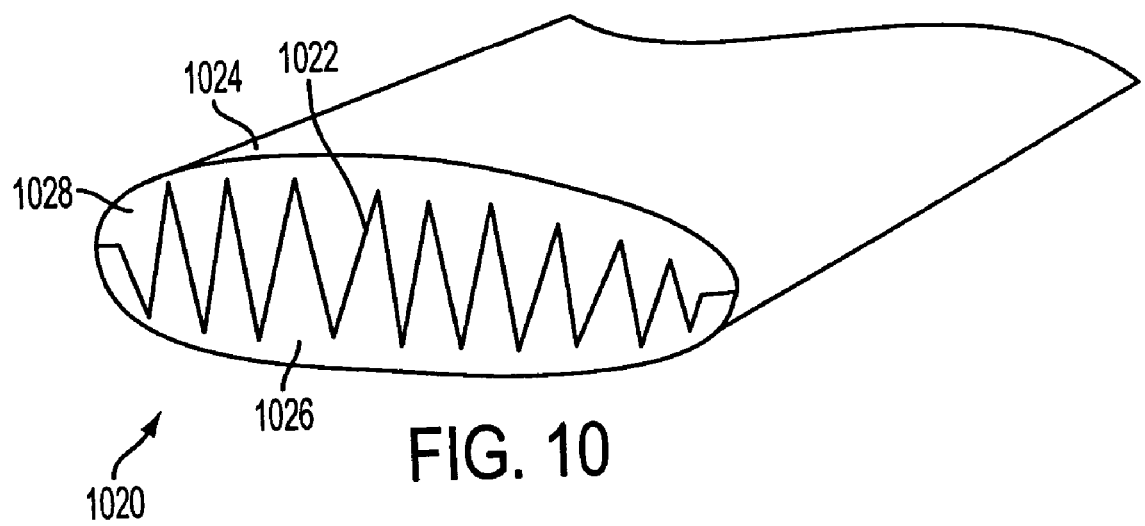
FIG. 10 shows a sectional view of another exemplary embodiment of a fuel separator.

FIG. 10 shows another exemplary embodiment of a separator, generally at 1020. Separator 1020 is similar to the other embodiments described above in that it includes a selective barrier 1022 and an outer wall 1024 that divides an interior defined by the outer wall into a first passageway 1026 and a second passageway 1028. However, selective barrier 1022 takes the form of a folded or pleated barrier, instead of a linear barrier. Mixed fuel may be provided to one of first passageway 1026 and second passageway 1028, and an extracted fuel component may be recovered from the other of first passageway 1026 and 1028. The use of a folded or pleated barrier as opposed to a linear barrier may help to increase the surface area of the selective barrier, and therefore may help to increase fuel separation rates. It will be appreciated that a folded or pleated barrier may also be used in conjunction with a tubular barrier structure such as those shown in the embodiments of FIGS. 7 and 8.

Figure 11:
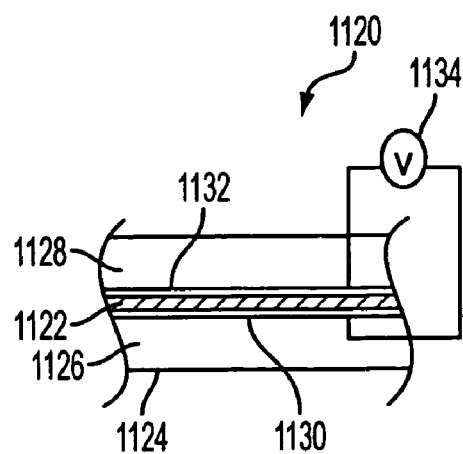
FIG. 11 shows a schematic view of another exemplary embodiment of a fuel separator.

FIG. 11 shows another exemplary embodiment of a separator, generally at 1120. Separator 1120 includes a selective barrier 1122, an outer wall 1124, and a first passageway 1126 and second passageway 1128 separated by the selective barrier. Separator 1120 also includes a first electrode 1130 and second electrode 1132 positioned on opposite sides of selective barrier 1122. Furthermore, selective barrier 1122 may be made at least partially of an ionically or electrically conductive polymeric or inorganic material, polypyrole being one example of a conductive polymer. A voltage and/or current may be applied across and/or through the membrane using a voltage and/or current supply 1134, respectively. In this embodiment, an ionic current could be induced across a membrane using the polarizable properties of an alcohol moiety. Furthermore, the hydroxide functional group may be induced to give up a proton during transport, creating an oxyanion that would be selectively transported by polar interaction with cationic functional groups on the surface and interior of the porous membrane material, and/or by the motion of the charged ethoxy anion in response to the applied electric field. In the depicted embodiment, electrodes 1130 and 1132 are shown as covering substantially the entire lower and upper surfaces of selective barrier 1122, respectively. However, it will be appreciated that electrodes of any suitable configuration and/or placement may be used to electrochemically or electrophoretically move a selected mixed fuel species across a selective membrane.

Figure 12:
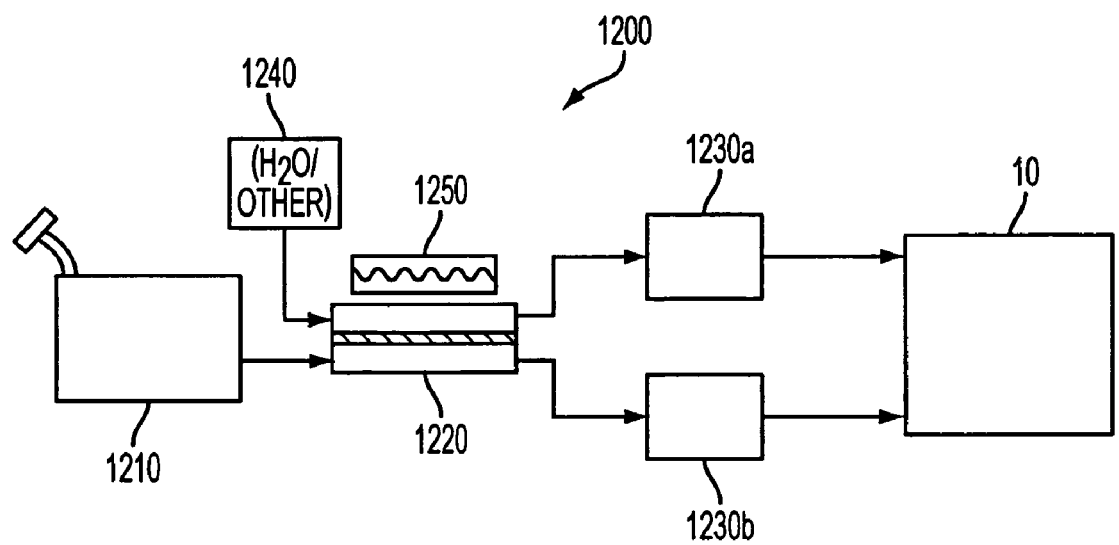
FIG. 12 shows a block diagram of another exemplary embodiment of a fuel system with a fuel separator.

FIG. 12 shows another exemplary embodiment of a fuel system, generally at 1200. Fuel system 1200 includes a fuel tank 1210, a fuel separator 1220, and first and second fuel fraction storage tanks for storing the enriched fuel fractions after separation and before provision to engine 10. Fuel system 1200 also includes an extraction fluid storage tank 1240 and a separator heater 1250. This is in contrast to the above-described embodiments where recirculated exhaust gases are utilized as an extraction fluid and as a heat source for heating the separator. Any suitable fluid may be used as the extraction fluid. For example, in some embodiments, the extraction fluid may comprise water that is either added to storage tank 1240 by a user on a periodic or occasional basis, and/or may comprise a condenser that is configured to condense water vapor from air to collect water for use as an extraction fluid. Furthermore, extraction fluid storage tank 1240 may comprise a storage tank conventionally utilized in vehicles for storing aqueous fluids. For example, in one embodiment, fluid storage tank 1240 comprises a windshield washer fluid tank from which fluid is drawn for washing a vehicle windshield and for extracting/removing the transported fuel component from separator 1220 after fuel separation.

Heater 1250 may optionally be utilized where it is desired to heat the separator, for example, to improve the transport rate of the desired fuel component across the selective barrier, and/or to cause the separated fuel component to be recovered in the gas phase in separator 1220 (i.e. to utilize a pervaporation separation). Any suitable heat source may be used as heater 1250. Examples include, but are not limited to, electric heaters, radiative heating from the engine, recirculated exhaust gases, and/or combinations of these heat sources.

Figure 13:
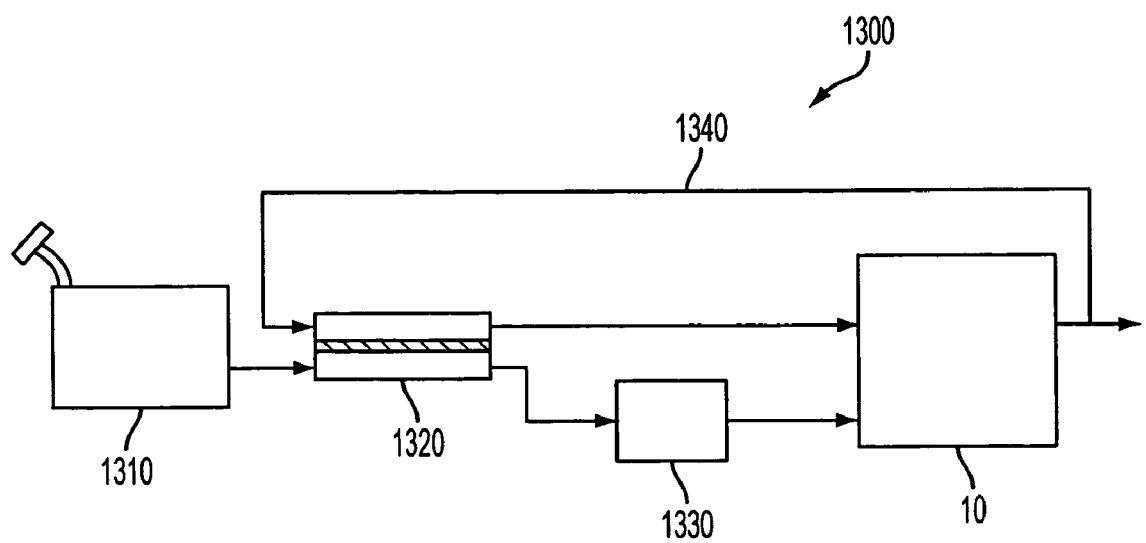
FIG. 13 shows a block diagram of another exemplary embodiment of a fuel system with a fuel separator.

FIG. 13 shows another exemplary embodiment of a fuel system, generally at 1300. Fuel system 1300 includes a fuel tank 1310, a fuel separator 1320, an exhaust gas recirculation system 1340 for heating the separator and/or recovering the extracted fuel species from the separator. However, fuel system 1300 includes only a single fuel fraction storage tank 1330, instead of two fuel fraction storage tanks. The other fuel fraction (for example, a pervaporated fuel fraction carried by the recirculated exhaust gas) is instead provided directly to engine 10, without condensation and storage. This fuel fraction may be provided to a direct injector, port injector, and/or intake manifold. It will be appreciated that various structures for controlling the flow of the gas phase fuel fraction into engine 10 may be utilized, including but not limited to a fuel pump, fuel rail, sensors for detecting a calorie content of the gaseous mixture, pressure sensors, etc.

Figure 14:
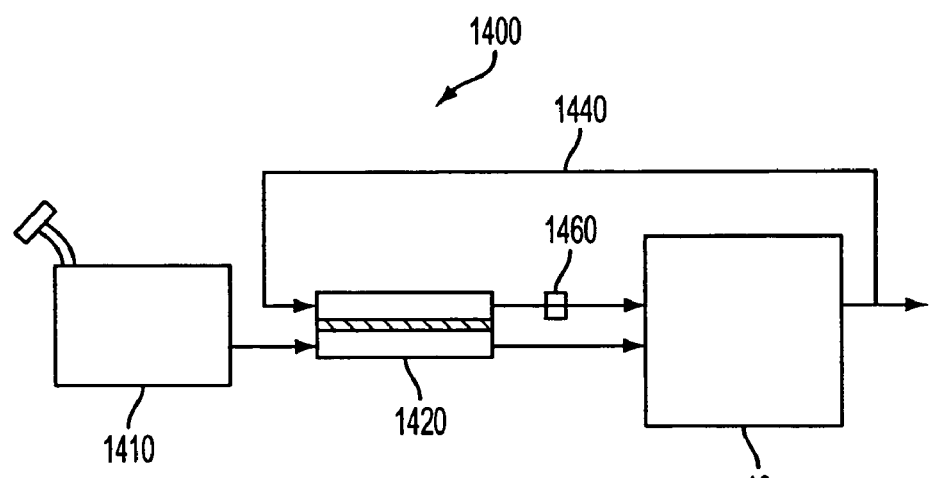
FIG. 14 shows a block diagram of another exemplary embodiment of a fuel system with a fuel separator.

FIG. 14 shows yet another exemplary embodiment of a fuel system, generally at 1400. Fuel system 1400 includes a fuel tank 1410, a separator 1420, and an exhaust gas recirculation system 1440 for heating the separator and/or recovering the extracted fuel species from the separator. However, fuel system 1440 does not include fuel fraction storage tanks disposed between the separator and engine 10. Instead, both fuel fractions are provided directly to the engine. Either or both fuel fractions may be provided to any suitable injector and/or may be provided directly to the intake manifold as a gaseous mixture where suitable.

As mentioned above, where the selective barrier utilizes pervaporation or produces a vaporous mixture of fuel as a product of the extraction, the fuel vapor may be delivered directly to a gaseous injector, or may be delivered into the intake manifold as a mixture with air or a combination of air and recirculated exhaust gases, and therefore back into the combustion chamber. In these embodiments, to help provide better control of combustion by determining the amount of fuel being delivered to the combustion chamber, an air/fuel ratio measurement could be made using a device, such as an universal exhaust gas oxygen sensor (shown, for example at 1460 in FIG. 14) or another suitable device to determine the fuel content of the gases being supplied to the injector or the intake manifold. The signal from this device may be used in a feedback control loop configuration and would modify the flow of either the gaseous fuel or the amount of air metered into the mixture entering the combustion chamber, as is conventional in the control of internal combustion engines.

In any of the embodiments described above, it may be desired to control the operation of the separator, for example, to adjust a quantity of fuel being separated in response to engine operating conditions. For example, in some situations, it may be desirable to reduce an amount of alcohol that is extracted from a hydrocarbon fuel. Where the selective barrier is configured to selectively transport an alcohol, the transport of alcohol may be slowed, for example, by reducing a temperature of the separator, by decreasing a flow of extraction fluid through the separator, by decreasing the pressure of the mixed fuel in the separator, or in any other suitable manner. Likewise, the transport rate of alcohol across the barrier may be increased, for example, by increasing a temperature of the separator, by increasing a flow of extraction fluid through the separator, by increasing a pressure of the mixed fuel in the separator, or in any other suitable manner. Likewise, where the selective barrier is configured to selectively transport a hydrocarbon, the rate of hydrocarbon transport may be adjusted in like manners. Furthermore, a bypass line (not shown) that bypasses the separator may be provided for use in situations in which it is desired not to separate the mixed fuel. Furthermore, separation may also be controlled by providing a mechanism for selectively opening or closing the second passageway of any of the embodiments of FIGS. 6-14 (where the extracted component is removed from the separators). Where the passageway is closed from the conduits to which it is connected, the vapor pressure and/or concentration of the extracted fuel component may increase, which may slow and eventually stop the transport of the extracted fuel component across the barrier. It will be appreciated that the performance of the separators may be adjusted in response to any suitable event or condition, including but not limited to, changing engine load, emissions conditions, different rates of consumption of the different fuel fractions, etc.

In some embodiments, the performance of a separator may be monitored to provide a greater degree of control over the separator. The performance of the separator may be monitored in any suitable manner. For example, a separation rate may be inferred or calculated from variables such as the temperature of the separator, the flow rate of the mixed fuel into the separator, the pressure of the mixed fuel within the separator, the composition of the mixed fuel, and/or the pressure and/or flow rate of recirculated exhaust gases (or other extraction fluid) within the separator. Furthermore, the separation rate also may be calculated by measuring the caloric content (for example, via a UEGO sensor) of the extracted fluid, and/or by optically measuring an alcohol content of a liquid-phase extraction fluid, where the extracted fluid is an alcohol. It will be appreciated that these are merely exemplary methods of monitoring, calculating or estimating a performance of a separator, and that any suitable method may be used.

The subject matter of the present disclosure includes all novel and nonobvious combinations and subcombinations of the various systems and configurations, and other features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. In an apparatus comprising a fuel tank, an internal combustion engine, and a separator positioned fluidically between the fuel tank and the internal combustion engine, a method of operating the apparatus, comprising:
   receiving a mixed fuel containing a hydrocarbon component and an oxygenated component into the separator;
   separating the mixed fuel in the separator into a first hydrocarbon-enriched fuel fraction and a second oxygenated fuel component-enriched fuel fraction; and
   controlling an amount of the first fuel fraction and an amount of the second fuel fraction provided to the engine based upon an engine operating condition.

2. The method of claim 1, wherein the oxygenated component comprises at least one of methanol, ethanol, and propanol, and wherein the hydrocarbon component comprises gasoline.

3. The method of claim 1, wherein the oxygenated component comprises at least one of dimethyl ether, an alcohol, and a methyl ester, and wherein the hydrocarbon component comprises diesel fuel.

4. The method of claim 1, wherein separating the mixed fuel comprises flowing the mixed fuel past a separator that comprises a material that selectively transports the oxygenated component at a higher rate than the hydrocarbon component.

5. The method of claim 4, wherein the separator comprises a membrane formed at least partially from at least one of a polysulfone, polyvinyl alcohol, poly ether ether ketone, polydimethyl siloxane, and cellulose triacetate.

6. The method of claim 1, wherein separating the mixed fuel comprises flowing the mixed fuel past a separator configured to selectively transport the oxygenated fuel component at a higher rate than the hydrocarbon component based upon a pore size of the separator.

7. The method of claim 1, wherein separating the mixed fuel comprises flowing the mixed fuel past a separator configured to electrochemically transport the oxygenated fuel component across a selective barrier in the separator.

8. The method of claim 1, further comprising storing the first fuel fraction and the second fuel fraction in separate storage tanks prior to providing the amount of the first fuel fraction and the amount of the second fuel fraction to the engine.

9. The method of claim 1, further comprising storing one of the first fuel fraction and the second fuel fraction in a storage tank after separation while supplying another of the first fuel fraction and the second fuel fraction to the engine without storage in a tank after separation.

10. The method of claim 1, wherein controlling an amount of the first fuel fraction and an amount of the second fuel fraction provided to the engine based upon an engine operating condition comprises providing a greater amount of the first fuel fraction to the engine relative to the second fuel fraction as an engine load increases.

11. The method of claim 1, wherein controlling an amount of the first fuel fraction and an amount of the second fuel fraction provided to the engine based upon an engine operating condition comprises providing a greater amount of the second fuel fraction to the engine relative to the first fuel fraction in response to engine knock.

12. The method of claim 1, further comprising heating the separator with recirculated exhaust gases.

13. The method of claim 1, wherein separating the mixed fuel includes adding a polar solvent to the mixed fuel and extracting at least a portion of the oxygenated fuel component with the polar solvent.

14. The method of claim 1, further comprising sensing a calorie content of at least one of the first fuel fraction and the second fuel fraction after separating the mixed fuel.

15. An apparatus, comprising:
an internal combustion engine;
a fuel tank in fluid communication with the internal combustion engine;
an alcohol-selective fuel separator disposed between the fuel tank and the internal combustion engine, the alcohol-selective fuel separator comprising a mixed fuel inlet, a hydrocarbon-enriched fuel fraction outlet, an alcohol-enriched fuel fraction outlet, and a selective barrier separating the hydrocarbon-enriched fuel fraction outlet and the alcohol-enriched fuel fraction outlet, the selective barrier being configured to transport alcohols at a higher rate than hydrocarbons.

16. The apparatus of claim 15, wherein the selective barrier is at least partially formed from at least one of a polysulfone, polyvinyl alcohol, poly ether ether ketone, polydimethyl siloxane, and cellulose triacetate.

17. The apparatus of claim 15, wherein the selective barrier is at least partially formed from a material configured to selectively transport the alcohols at a higher rate than the hydrocarbons based upon a pore size of the material.

18. The apparatus of claim 15, wherein the selective barrier is formed from an ionically or electrically conductive material, and further comprising a pair of electrodes disposed adjacent to the selective barrier.

19. The apparatus of claim 15, wherein the separator comprises a divider between a first passageway and a second passageway, wherein the divider has at least one of a folded structure, flat structure, and curved structure.

20. The apparatus of claim 15, further comprising an alcohol fuel storage tank disposed fluidically between the alcohol-enriched fuel fraction outlet of the separator and the engine.

21. The apparatus of claim 15, further comprising a hydrocarbon fuel storage tank disposed fluidically between the hydrogen-enriched fuel fraction outlet of the separator and the engine.

22. An apparatus, comprising:
an internal combustion engine;
a fuel tank in fluid communication with the internal combustion engine; and
an alcohol-selective fuel separator disposed between the fuel tank and the internal combustion engine, the alcohol-selective fuel separator comprising a mixed fuel inlet, a hydrocarbon-enriched fuel fraction outlet, an alcohol-enriched fuel fraction outlet, and selective barrier separating the hydrocarbon-enriched fuel fraction outlet and the alcohol-enriched fuel fraction outlet, the selective barrier comprising a membrane formed from at least one of a polysulfone, polyvinyl alcohol, poly ether ether ketone, polydimethyl siloxane, and cellulose triacetate.

23. The apparatus of claim 22, wherein the separator comprises a divider between a first passageway and a second passageway.

24. The apparatus of claim 23, wherein the divider has at least one of a generally flat configuration, a folded configuration, and a curved configuration.

25. The apparatus of claim 22, further comprising an alcohol fuel storage tank disposed fluidically between the alcohol-enriched fuel fraction outlet of the separator and the engine.

26. The apparatus of claim 22, further comprising a hydrocarbon fuel storage tank disposed fluidically between the hydrocarbon-enriched fuel fraction outlet of the separator and the engine.

* * * * *